United States Patent
Banker et al.

(10) Patent No.: US 9,890,691 B2
(45) Date of Patent: Feb. 13, 2018

(54) METHOD AND SYSTEM TO REDUCE CHARGE AIR COOLER CONDENSATION

(71) Applicant: Ford Global Technologies, LLC, Dearborn, MI (US)

(72) Inventors: Adam Nathan Banker, Canton, MI (US); Baitao Xiao, Canton, MI (US); Hamid-Reza Ossareh, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 183 days.

(21) Appl. No.: 14/829,968

(22) Filed: Aug. 19, 2015

(65) Prior Publication Data

US 2017/0051659 A1  Feb. 23, 2017

(51) Int. Cl.
| | |
|---|---|
| *F02B 33/44* | (2006.01) |
| *F02B 29/04* | (2006.01) |
| *F02B 37/12* | (2006.01) |
| *F02B 37/14* | (2006.01) |
| *F02B 39/10* | (2006.01) |
| *F02M 35/04* | (2006.01) |
| *F02D 41/00* | (2006.01) |

(52) U.S. Cl.
CPC ...... *F02B 29/0418* (2013.01); *F02B 29/0493* (2013.01); *F02B 37/12* (2013.01); *F02B 37/14* (2013.01); *F02B 39/10* (2013.01); *F02D 41/0007* (2013.01); *F02M 35/042* (2013.01); *F02B 2037/122* (2013.01); *F02D 2200/0418* (2013.01); *Y02T 10/144* (2013.01); *Y02T 10/146* (2013.01)

(58) Field of Classification Search
CPC .. F02B 29/0418; F02B 29/0493; F02B 39/10; F02B 37/12; F02B 37/14; F02B 2037/122; F02M 35/042
USPC ............. 60/611, 612, 599; 123/562, 565
See application file for complete search history.

(56) References Cited

U.S. PATENT DOCUMENTS

| | | | | |
|---|---|---|---|---|
| 6,922,995 B2 * | 8/2005 | Kawamura | ............. | F02B 39/10 60/608 |
| 6,938,420 B2 * | 9/2005 | Kawamura | ............. | F02D 23/00 60/608 |
| 7,451,597 B2 * | 11/2008 | Kojima | ............. | F02B 39/10 60/611 |

(Continued)

FOREIGN PATENT DOCUMENTS

| | | | | |
|---|---|---|---|---|
| DE | 102010027220 A1 * | 1/2012 | .............. | F02B 39/10 |
| WO | WO 2004046519 A1 * | 6/2004 | .......... | F02B 29/0406 |
| WO | WO 2014083248 A1 * | 6/2014 | ............. | F02D 23/00 |

OTHER PUBLICATIONS

Xiao, Baitao et al., "Methods and Systems for Boost Control," U.S. Appl. No. 14/799,289, filed Jul. 14, 2015, 34 pages.

(Continued)

*Primary Examiner* — Thai Ba Trieu
(74) *Attorney, Agent, or Firm* — Julia Voutyras; McCoy Russell LLP

(57) ABSTRACT

Methods and systems for operating an engine that includes a compressor and charge air cooler are disclosed. In one example, air flow through the charge air cooler is increased in response to condensation accumulating in the charge air cooler without increasing engine torque. Air flow through the charge air cooler is increased to gradually reduce condensation within the charge air cooler.

19 Claims, 4 Drawing Sheets

(56) References Cited

U.S. PATENT DOCUMENTS

| | | | |
|---|---|---|---|
| 7,958,730 B2 | 6/2011 | Stewart | |
| 8,033,272 B2* | 10/2011 | Morizane | F02B 39/10 123/565 |
| 8,176,735 B2 | 5/2012 | Komatsu | |
| 8,429,912 B2* | 4/2013 | Guggenberger | F02D 23/00 60/611 |
| 2010/0242899 A1* | 9/2010 | Hitomi | F02D 41/3035 123/564 |
| 2013/0209291 A1* | 8/2013 | Kitsukawa | F02B 39/10 417/410.1 |
| 2014/0127002 A1 | 5/2014 | Joergl et al. | |
| 2014/0157772 A1 | 6/2014 | Glugla et al. | |
| 2014/0290630 A1 | 10/2014 | Pursifull | |
| 2014/0305412 A1* | 10/2014 | Ahrns | F02D 41/0007 60/608 |
| 2014/0305413 A1* | 10/2014 | Ahrns | F02D 41/0007 60/608 |
| 2014/0325979 A1 | 11/2014 | Morelli et al. | |
| 2015/0345371 A1* | 12/2015 | Russ | F02D 23/00 123/542 |
| 2016/0169170 A1* | 6/2016 | Russ | F02D 23/00 60/599 |

OTHER PUBLICATIONS

Xiao, Baitao et al., "Methods and Systems for Boost Control," U.S. Appl. No. 14/799,342, filed Jul. 14, 2015, 35 pages.
Xiao, Baitao et al., "Methods and Systems for Boost Control ," U.S. Appl. No. 14/942,487, filed Nov. 16, 2015, 38 pages.

* cited by examiner

METHOD AND SYSTEM TO REDUCE CHARGE AIR COOLER CONDENSATION

BACKGROUND/SUMMARY

A turbocharged engine applies exhaust gas energy to spin a compressor that pressurizes air supplied to engine cylinders. Compressing air entering the engine elevates intake air temperature. The increased air temperature may decrease engine power by reducing the cylinder charge density. One way to reduce air charge temperature of a turbocharged engine is to install a charge air cooler (CAC) downstream of the turbocharger compressor in the engine's air intake system. Temperature of compressed air entering the CAC is reduced by transferring heat from the compressed air to ambient air or a liquid coolant. Consequently, engine power may be increased by operating engine cylinders with a greater charge density as compared to if the same engine were operated without a CAC. However, air entering the engine may include water vapor that condenses within the CAC when air is cooled within the CAC. If the condensed water is drawn into the engine it may cause combustion instability in the engine. Therefore, it would be desirable to operate an engine in a way that allows the engine to benefit from the CAC with a lower possibility of ingesting condensed water.

The inventors herein have recognized the above-mentioned disadvantages and have developed a method for operating engine compressors, comprising: passing air through a first compressor and a second compressor in an engine air intake; and returning a portion of air passing through the second compressor to the engine air intake downstream of the first compressor and upstream of the second compressor via opening a charge air cooler bypass valve.

By returning a portion of air flowing through a second compressor, it may be possible to increase air flow through the engine air intake system so that condensation may be gradually removed from a charge air cooler without increasing engine torque or significantly increasing fuel consumption. Increased air flow through the charge air cooler allows the air to carry additional water vapor so that water vapor may be gradually inducted into the engine without significantly affecting engine combustion stability.

The present description may provide several advantages. Specifically, the approach may improve engine combustion stability. Further, the approach may reduce accumulation of water within a charge air cooler. Further still, the approach may be selectively applied so that vehicle fuel consumption may not be significantly affected.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
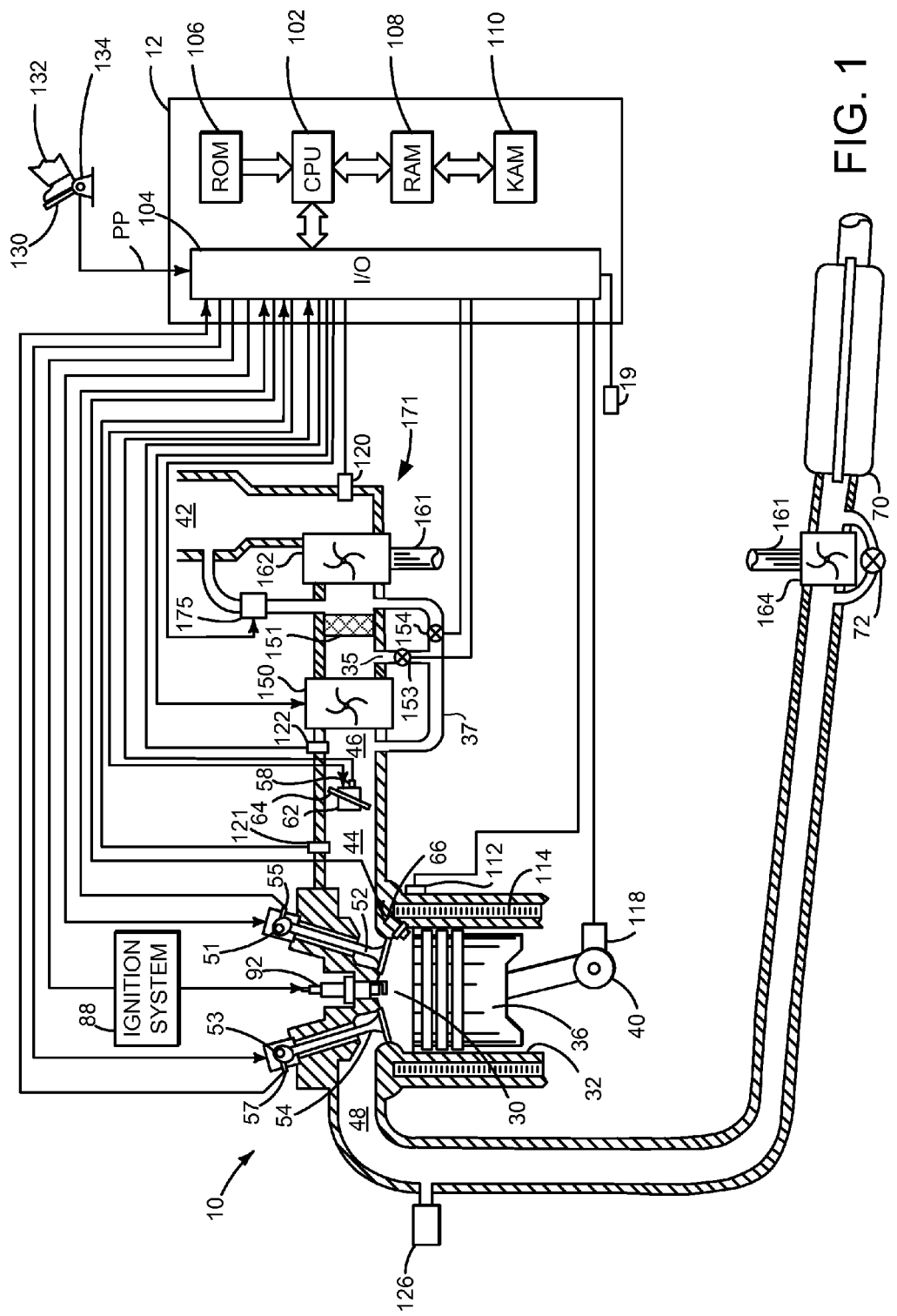
FIG. 1 shows a schematic depiction of an engine.
Figure 3:
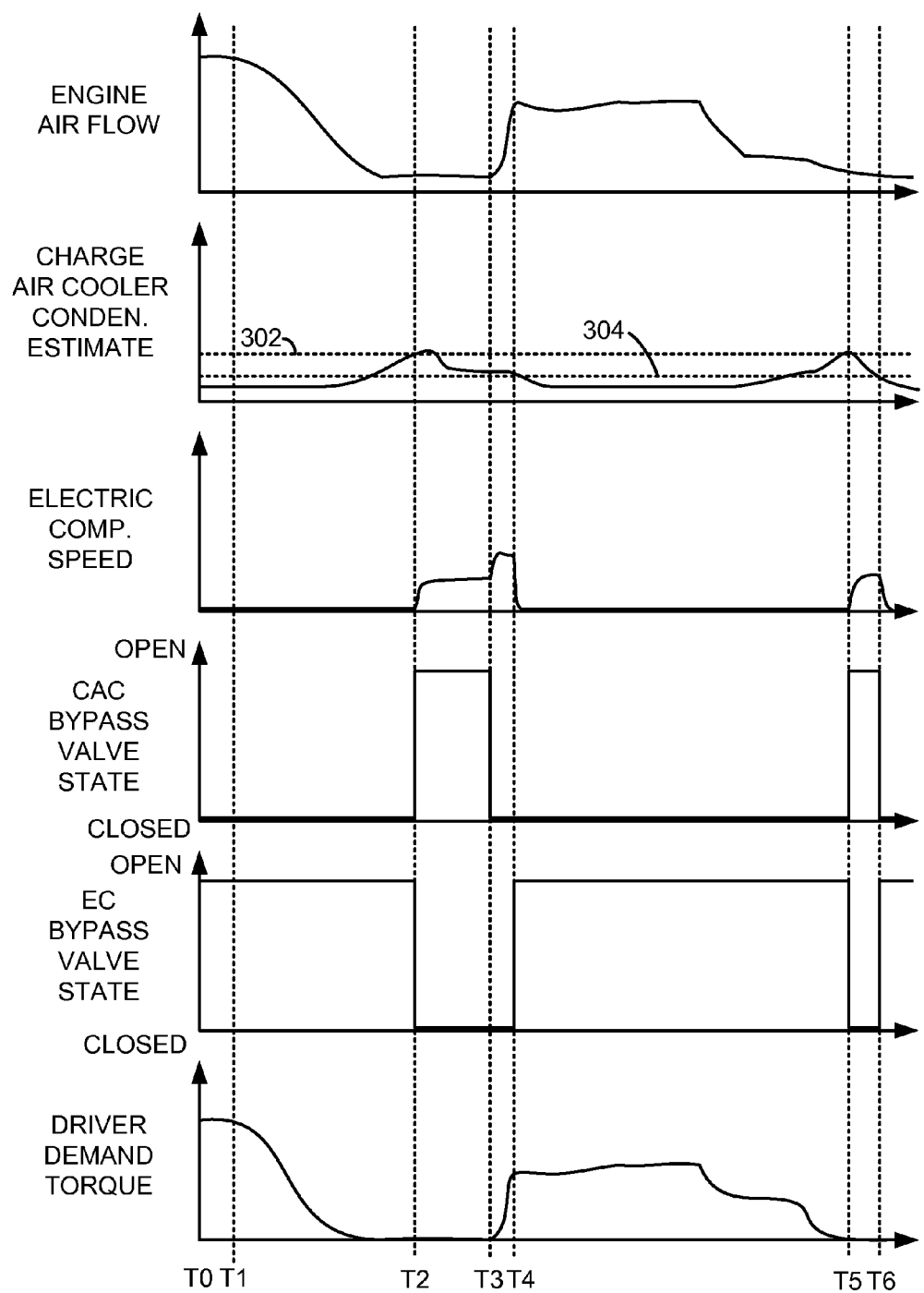
FIG. 3 shows an example engine operating sequence for reducing charge air cooler condensation.
Figure 4:
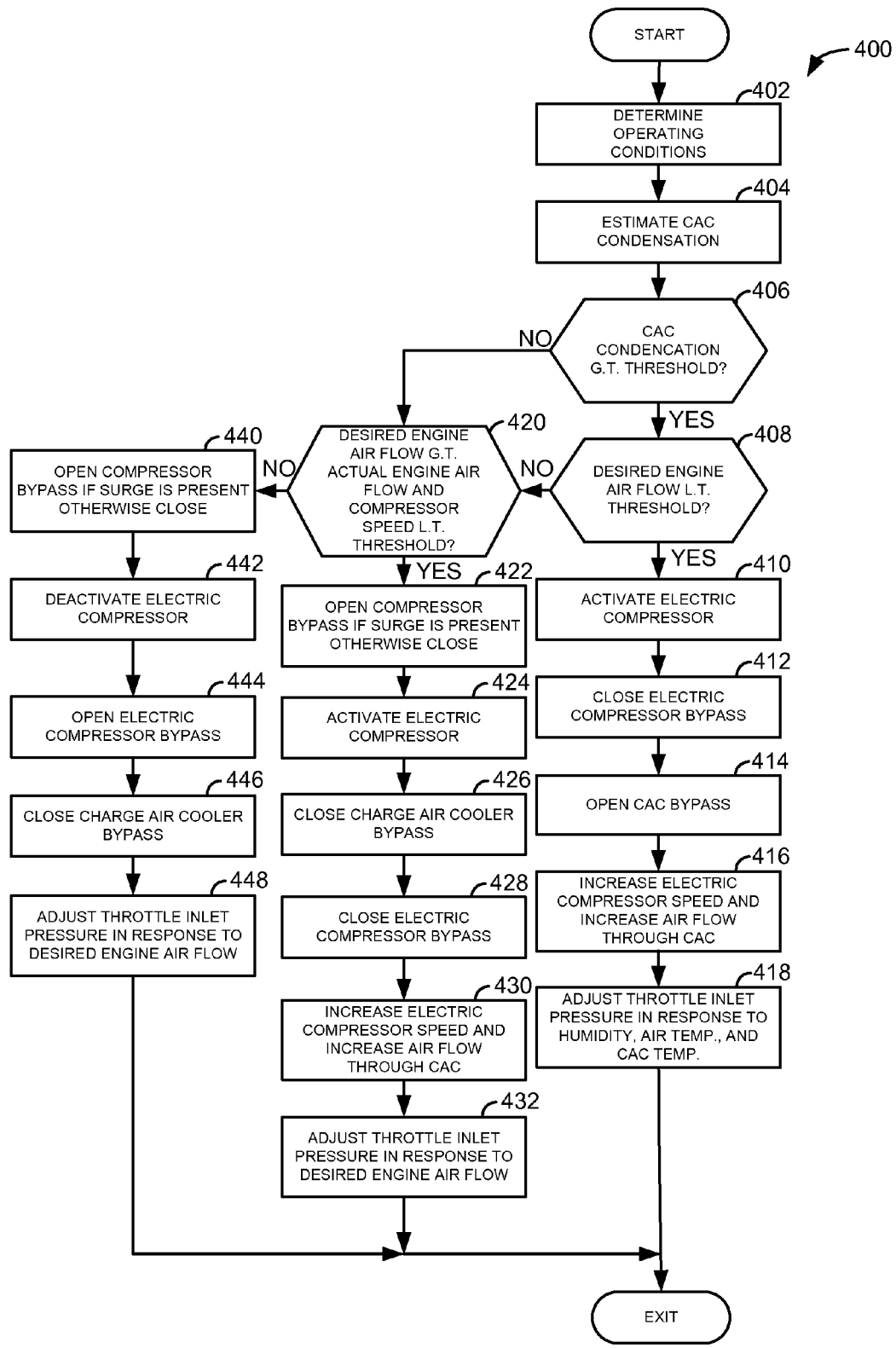
FIG. 4 shows an example method for reducing charge air cooler condensation.

The present description is related to operating an engine that includes a compressor and charge air cooler. Condensation that may accumulate within the charge air cooler may be removed by increasing air flow through the charge air cooler while maintaining engine air flow at a constant air flow (e.g., ±5%). FIG. 1 shows an example engine including two compressors and a charge air cooler. Air flow though the charge air cooler may be increased by flowing air in the direction shown in FIG. 2. An example engine operating sequence where charge air cooler condensation is reduced is shown in FIG. 3. A method for reducing charge air cooler condensation is shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided from controller 12. Fuel is delivered to fuel injector 66 by a fuel system including a fuel tank (not shown), fuel pump (not shown), and fuel rail (not shown). In addition, intake manifold 44 is shown communicating with optional electronic throttle 62 which adjusts a position of throttle plate 64 to control air flow from intake boost chamber 46.

Compressor 162 draws air from engine air inlet 42 to supply boost chamber 46. Exhaust gases spin turbine 164 which is coupled to compressor 162 via shaft 161. Exhaust driven compressor bypass valve 175 may be electrically operated via a signal from controller 12. Compressor bypass valve 175 allows pressurized air to be circulated back to the compressor inlet to limit boost pressure. Similarly, waste gate actuator 72 allows exhaust gases to bypass turbine 164 so that boost pressure can be controlled under varying operating conditions.

Electrically driven compressor 150 may be selectively activated via controller 12. Electrical energy from an electric energy storage devices and/or an alternator (not shown) supplies energy to rotate electrically driven compressor 150. Electrically driven compressor bypass passage 35 includes an electrically driven compressor bypass valve 153 that may be selectively opened to allow air to flow from compressor 162 to boost chamber 46 without passing through electrically driven compressor 150.

Charge air cooler 151 cools air entering engine air intake 171. Charge air cooler 151 may be an air-to-air cooler or a liquid-to-air cooler. Charge air cooler bypass passage 37 includes a charge air cooler bypass valve 154. Air may flow from compressor 162 to boost chamber 46 when electric compressor 150 is deactivated and charge air cooler bypass valve 154 is open. Air may flow from compressor 150 to upstream of charge air cooler 151 when compressor 150 is activated and charge air cooler bypass valve 154 is open.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory (non-transitory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; ambient air humidity from humidity sensor 19; a measurement of engine manifold pressure (MAP) from pressure sensor 121 coupled to intake manifold 44; a measurement of boost pressure or throttle inlet pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Air flows through the engine from engine air inlet 42 past compressor 162, charge air cooler 151, electrically drive compressor 150, and throttle 62 before entering engine intake manifold 44. Air enters combustion chamber 30 from engine intake manifold 44 before proceeding to exhaust manifold 48 as combustion byproducts or air. Air and/or combustion byproducts are then released to atmosphere after passing turbine 164 and passing through converter 70. Thus, engine air inlet 42 is upstream of compressor 162, charge air cooler 151, electrically driven compressor 150, and combustion chamber 30 according to a direction of air flow through engine 10.

Thus, the system of FIG. 1 provides for an engine system, comprising: an engine including an air intake; an exhaust gas driven compressor positioned along the air intake; an electrically driven compressor posited along the air intake downstream of the exhaust gas driven compressor; a charge air cooler including a charge air cooler bypass passage and a charge air cooler bypass valve; and a controller including non-transitory instructions to open the charge air cooler bypass valve in response to an amount of condensation in the charge air cooler exceeding a threshold.

In some examples, the engine system further comprises an electrically driven compressor bypass passage and an electrically driven compressor bypass valve. The engine system further comprises additional non-transitory instructions to close the electrically driven compressor bypass valve in response to an amount of condensation in charge air cooler exceeding the threshold. The engine system further comprises additional non-transitory instructions to adjust a throttle inlet pressure in response to the amount of condensation in the charge air cooler. The engine system further comprises additional non-transitory instructions to adjust the throttle inlet pressure in response to engine air flow or a driver demand torque. In some examples, the engine system further comprises additional non-transitory instructions to increase air flow through the charge air cooler while maintaining a substantially constant engine torque (e.g., ±5% of a constant value). The substantially constant engine torque may be provided when driver demand torque is at or near zero.

Figure 2:
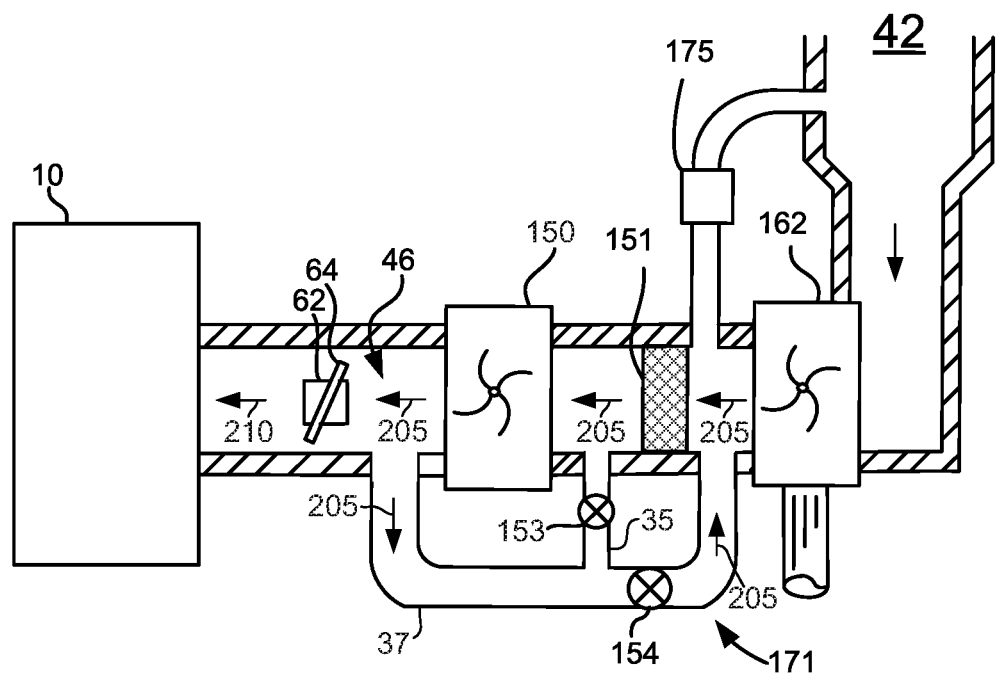
FIG. 2 shows a schematic illustrating engine air flow according to the present description.

Referring now to FIG. 2, a schematic illustrating engine air flow according to one aspect of the present description is shown. FIG. 2 shows air flow in engine components shown in FIG. 1. Elements shown in FIG. 2 that are labeled with the same numeric values shown in FIG. 1 are the same elements shown in FIG. 1. Therefore, for the sake of brevity, a description of these elements is omitted.

During engine operating conditions where an estimate of condensation in charge air cooler 151 is greater than a threshold, the engine may be operated to provide air flow in the engine air intake 171 in the direction of arrows 205. In particular, air flows from engine air inlet 42 to compressor 162. Air flows from compressor 162 through charge air cooler 151 and electrically driven compressor 150. A portion of air enters engine 10 as shown by arrow 210 and the remaining air flows through charge air cooler bypass passage 36 before returning to upstream of charge air cooler 151. Charge air cooler bypass valve is opened to allow air flow in direction 205. Electric compressor bypass valve 153 is closed.

The speed of electrically driven compressor 150 may be varied to decrease condensation within charge air cooler 151 and increase water content in air flowing into the engine and in direction 205. As the velocity of air through charge air cooler 151 increases, additional water vapor may be entrained in the circulating air. Electrically driven compressor speed may be varied to conserve electrical energy.

Referring now to FIG. 3, a prophetic engine operating sequence is shown. The engine operating sequence may be provided by the system of FIG. 1 according to the method of FIG. 4. Vertical lines shown at T0-T6 represent times of particular interest in the sequence. The plots are time aligned and occur at a same time.

The first plot from the top of FIG. 3 is a plot of engine air flow versus time. The vertical axis represents engine air flow and engine air flow increases in the direction of the vertical axis arrow. The horizontal axis represents time and time increases from the left side of the plot to the right side of the plot.

The second plot from the top of FIG. 3 is a plot of estimated accumulated charge air cooler condensation versus time. The vertical axis represents an estimated amount of accumulated air cooler condensation (e.g., water) and the amount of accumulated air cooler condensation increases in the direction of the vertical axis arrow. The horizontal axis represents time and time increases from the left side of the plot to the right side of the plot. Horizontal line 302 represents a threshold amount of charge air cooler condensation above which the engine enters a condensation reduction mode where the electrically driven compressor is activated to reduce condensation in the charge air cooler. Horizontal line 304 represents a threshold amount of charge air cooler condensation below which the engine exits a condensation reduction mode where the electrically driven compressor is deactivated to reduce electrical energy consumption.

The third plot from the top of FIG. 3 is a plot of electrically driven compressor speed versus time. The vertical axis represents electrically driven compressor speed and electrically driven compressor speed increases in the direction of the vertical axis arrow. The horizontal axis represents time and time increases from the left side of the figure to the right side of the figure.

The fourth plot from the top of FIG. 3 is a plot of charge air cooler (CAC) bypass valve operating state versus time. The vertical axis represents CAC bypass valve operating state. The CAC bypass valve is open when the trace is at a higher level near the vertical axis arrow. The CAC bypass valve is closed when the trace is at a lower level near the horizontal axis. The horizontal axis represents time and time increases from the left side of the figure to the right side of the figure.

The fifth plot from the top of FIG. 3 is a plot of electrically driven compressor (EC) bypass valve operating state versus time. The vertical axis represents EC bypass valve operating state. The EC bypass valve is open when the trace is at a higher level near the vertical axis arrow. The EC bypass valve is closed when the trace is at a lower level near the horizontal axis. The horizontal axis represents time and time increases from the left side of the figure to the right side of the figure.

The sixth plot from the top of FIG. 3 is a plot of driver demand torque versus time. The vertical axis represents driver demand torque and driver demand torque increases in the direction of the vertical axis arrow. The horizontal axis represents time and time increases from the left side of the figure to the right side of the figure.

At time T0, the engine air flow is at a higher level and the CAC condensation estimate is at a lower level. The electrically driven compressor is not activated and the CAC bypass valve is closed. The EC bypass valve is open to allow air to flow through the exhaust driven compressor to the CAC and engine without flowing through the electrically driven compressor. This allows electrical energy to be conserved. During such conditions, air flow through the engine may be sufficiently high so that condensation in the CAC is relatively low because the air flow rate into the engine is high enough so that water vapor remains entrained in the air as the air enters engine cylinders. If the ambient humidity level is high, water vapor may enter the engine and act to dilute the cylinder charge.

At time T1, the driver reduces the driver demand torque by at least partially releasing the accelerator pedal. The engine air flow is reduced in response to the reduction in driver demand torque. The other engine operating conditions remain at their previous levels.

Between time T1 and time T2, the driver demand torque is reduced to a value of substantially zero (e.g., less than ±5% of full scale demand) and the engine air flow is reduced to a lower level in response to the lower driver demand torque. The CAC condensation estimate begins to increase in response to the lower engine air flow and water vapor in air drawn into the engine. The electrically driven compressor remains off and the CAC bypass valve remains closed. The EC bypass valve remains open.

At time T2, the CAC condensation estimate has increased to a level of 302. The electrically driven compressor is activated and the CAC bypass valve is opened in response to CAC condensation estimate being at level 302. Additionally, the EC bypass valve is closed in response to the CAC condensation estimate. The driver demand torque remains at a lower level.

By activating the electrically driven compressor, opening the CAC bypass valve, and closing the EC bypass valve, air flow through the CAC cooler may be increased without increasing air flow through the engine cylinders. The increased air flow rate may allow air in the engine intake to hold additional water vapor so that the water vapor may be inducted into the engine gradually over time so that a large amount of water is not drawn into engine cylinders during an increase in driver demand torque.

Between time T2 and time T3, the CAC condensation estimate decreases in response to water being liberated from the CAC and into the engine's cylinders. Because driver demand torque is low, the condensation may be drawn slowly into the engine. Further, the electrically driven compressor speed is controlled so that a large amount of water does not become entrained in air in the engine intake.

At time T3, the driver demand torque increases in response to the driver applying the accelerator pedal. The speed of the electrically driven compressor is increased in response to the increase in driver demand torque and the CAC bypass valve is closed in response to the increased driver demand torque. Closing the CAC bypass valve cools air entering the engine and ceases air flow from the electrically driven compressor to the inlet of the CAC. The EC bypass valve remains closed so that flow from the electrically driven compressor flows to the engine without being returned to the electrically driven compressor. The engine air flow also increases in response to the increase in driver demand torque. Additionally, the exhaust driven compressor bypass valve 175 may be opened to increase air flow to the electrically driven compressor while the exhaust gas driven compressor speed is increasing.

At time T4, air flow through the exhaust driven compressor has reached a threshold level (not shown). Consequently, the electrically driven compressor is stopped and the EC bypass valve is opened so that air flow from the exhaust driven compressor may bypass the electrically driven compressor, thereby negating the usefulness of operating the electrically driven compressor. The CAC bypass valve remains closed and the engine air flow stabilizes at a nearly constant value as the driver demand torque stabilizes at a nearly constant level. In this way, the electrically driven compressor may rapidly increase air flow to the engine to decrease turbocharger delay. When the turbocharger reaches a speed to provide a desired air flow, the electrically driven compressor is deactivated to conserve electrical energy.

Between time T4 and time T5, the driver demand torque is varied by the driver and the engine air flow varies as driver demand torque varies. The CAC condensation amount estimate is reduced since condensation is removed from the CAC by air flowing through the CAC. The air also retains moisture well at higher air flows. The electrically driven compressor remains off and the EC bypass valve remains open. The CAC bypass valve also remains closed. Near time T5, the driver demand torque and engine air flow are reduced in response to the driver releasing the accelerator pedal. The CAC condensation estimate increases as the engine air flow is decreased.

At time T5, the CAC condensation estimate reaches threshold level 302. Consequently, the electrically driven compressor is activated, the CAC bypass valve is opened, and the EC valve is closed. These actions increase air flow through the CAC so that air circulating in the engine intake may hold a larger amount of water vapor. The CAC condensation estimate begins to decrease after the electrically driven compressor is activated. The engine inducts some air flowing through the electrically driven compressor, thereby reducing the amount of water vapor in the engine intake.

At time T6, the CAC condensation estimate (e.g., the estimated amount of water in the CAC) is reduced to threshold 304. Therefore, the electrically driven compressor is deactivated and the CAC bypass valve is closed. The EC bypass valve is also opened to allow air to flow from the exhaust gas driven compressor. Alternatively, the EC bypass valve may be held closed in anticipation of an impending increase in driver demand torque.

In this way, condensation within a CAC may be removed by coordinated operation of two different compressors. Further, CAC bypass valve operation and EC bypass valve operation are controlled to remove CAC condensation.

Referring now to FIG. 4, an example method for operating a turbocharged engine including a CAC is shown. At least portions of the method of FIG. 4 may be incorporated to controller 12 in the system of FIG. 1 as executable instructions stored in non-transitory memory. Further, portions of the method of FIG. 4 may be actions taken by controller 12 in the physical world to transform vehicle operating conditions. The method of FIG. 4 may provide the operating sequence shown in FIG. 3.

At 402, method 400 determines vehicle operating conditions including but not limited to driver demand torque, throttle inlet pressure, desired engine air flow, engine speed, ambient humidity, ambient air temperature, intake air temperature, and CAC temperature via querying the various sensors shown in FIG. 1. Method 400 proceeds to 404 after operating conditions are determined.

At 404, method 400 estimates an amount of condensation in the CAC. In one example, tables or functions including empirically determined data are the basis for estimating CAC condensation. For example, ambient air humidity, CAC temperature, intake air temperature, and air flow rate through the CAC may be used to index values in one or more tables or functions. The one or more tables or functions output an estimate of CAC condensation. Method 400 proceeds to 406 after CAC condensation is estimated.

At 406, method 400 judges if an amount of CAC condensation is greater than a threshold amount. If method 400 judges that the amount of CAC condensation is greater than (G.T.) the threshold, the answer is yes and method 400 proceeds to 408. Otherwise, the answer is no and method 400 proceeds to 420.

At 408, method 400 judges if desired engine air flow is less than a threshold amount. The threshold amount may be an air flow that is less than an air flow rate that extracts a threshold amount of condensation from the CAC in a specified amount of time. If method 400 judges that the desired engine air flow is less than the threshold amount, the answer is yes and method 400 proceeds to 410. Otherwise, the answer is no and method 400 proceeds to 420.

At 410, method 400 activates the electrically driven compressor. The electrically driven compressor is activated by permitting current to flow to the electrically driven compressor. Activating the electrically driven compressor allows additional air flow through the CAC, and air flow through the CAC may be greater than engine air flow. Method 400 proceeds to 412 after the electrically driven compressor is activated.

At 412, method 400 closes the electrically driven compressor bypass valve. The electrically driven compressor bypass valve may be closed via supplying a voltage to the valve. Closing the electrically driven compressor bypass valve ensures that air does not flow directly from the electrically driven compressor outlet to the electrically driven compressor inlet. Method 400 proceeds to 414 after the electrically driven compressor bypass valve is closed.

At 414, method 400 opens the CAC bypass valve. The CAC bypass valve may be opened via supplying a voltage to the valve. Opening the CAC bypass valve allows air to flow directly from the electrically driven compressor outlet to the CAC inlet. Additionally, the exhaust gas driven compressor bypass valve may be closed. Method 400 proceeds to 416 after the CAC bypass valve is opened.

At 416, method 400 increases speed of the electrically driven compressor to increase air flow through the CAC. Air flow through the CAC may be increased because at least a portion of air flowing through the electrically driven compressor is returned downstream of the exhaust driven compressor and upstream of the CAC. Method 400 proceeds to 418 after speed of the electrically driven compressor is increased.

At 418, method 400 adjusts throttle inlet pressure via adjusting speed of the electrically driven compressor. In one example, a desired throttle inlet pressure is based on ambient air humidity, CAC temperature, engine intake air temperature, amount of condensation in the CAC, and driver demand torque or desired engine air flow. Tables and/or functions that store empirically determined throttle inlet pressures are indexed by ambient air humidity, CAC temperature, amount of condensation in the CAC, engine intake air temperature, and driver demand torque or desired engine air flow. The tables and/or functions output the desired throttle inlet pressure. The electronically driven compressor speed is adjusted based on throttle inlet pressure feedback. Method 400 proceeds to exit after the throttle inlet pressure is adjusted.

In this way, the electrically driven compressor may be activated, the CAC bypass valve opened, and the EC bypass valve closed in response to a request to decrease an amount of condensation in a CAC. Further, the amount of water entrained in the inlet air is adjusted via adjusting the electrically driven compressor speed. For example, if it is desired to increase the amount of water vapor in air circulating in the engine intake, the electrically driven compressor speed may be increased.

At 420, method 400 judges if a desired engine air flow is greater than (G.T.) an actual engine air flow and if the turbocharger compressor speed is less than (L.T.) a threshold speed. A high desired engine air flow and a low turbocharger compressor speed may be indicative of a request to accelerate the vehicle during conditions when exhaust gas driven turbocharger lag (e.g., slower response time) may be present. If the a desired engine air flow is greater than (G.T.) an actual engine air flow and if the turbocharger compressor speed is less than (L.T.) a threshold speed, the answer is yes and method 400 proceeds to 422. Otherwise, the answer is no and method 400 proceeds to 440.

At 422, method 400 opens the exhaust gas driven compressor bypass valve if exhaust gas driven compressor surge is detected. Otherwise, the exhaust gas driven compressor bypass valve is closed. But in some examples, the exhaust gas driven compressor bypass valve may be opened to increase air flow to the electrically driven compressor if flow through the exhaust gas driven compressor is low. Method 400 proceeds to 424.

At 424, method 400 activates the electrically driven compressor. By activating the electrically driven compressor, lag of engine torque production from the exhaust gas driven turbocharger may be reduced. Method 400 proceeds to 426.

At 426, method 400 closes the CAC bypass valve. Closing the CAC bypass valve allows air flowing through the exhaust gas driven compressor to be cooled and it stops air flow from the throttle inlet to the CAC. Method 400 proceeds to 428.

At 428, method 400 closes the electrically driven compressor bypass valve. Closing the electrically driven compressor bypass valve prevents air from flowing from the CAC to the throttle inlet without flowing through the electrically driven compressor. Method 400 proceeds to 430.

At 430, method 400 increases speed of the electrically driven compressor to increase air flow to the engine. Air flow to the engine may be increased to reduce turbocharger lag. Method 400 proceeds to 432 after speed of the electrically driven compressor is increased.

At 432, method 400 adjusts throttle inlet pressure in response to a desired engine air flow rate. The throttle inlet pressure may be adjusted via adjusting electrically driven compressor speed. Method 400 proceeds to exit.

In this way, the electrically driven compressor may be activated during conditions of potential turbocharger lag to improve engine torque response. Further, the CAC bypass valve, electrically driven compressor bypass valve, and exhaust gas driven compressor bypass valve are adjusted to reduce turbocharger lag.

At 440, method 400 opens the exhaust gas driven compressor bypass valve if exhaust gas driven compressor surge is detected. Otherwise, the exhaust gas driven compressor bypass valve is closed. Method 400 proceeds to 442.

At 442, method 400 deactivates the electrically driven compressor. The electrically driven compressor may be deactivated by ceasing to supply the compressor voltage and current. Method 400 proceeds to 444.

At 444, method 400 opens the electrically driven compressor bypass valve. The valve is opened to allow air to flow from the CAC outlet to the throttle without passing through the electrically driven compressor. Therefore, the electrical energy may be conserved when air flow through the exhaust gas driven compressor is greater than a threshold. Method 400 proceeds to 446.

At 446, method 400 closes the CAC bypass valve. Closing the CAC bypass valve allows air flowing through the exhaust gas driven compressor to be cooled and it stops air flow from the throttle inlet to the CAC. Method 400 proceeds to 448.

At 448, method 400 adjusts throttle inlet pressure in response to a desired engine air flow rate. The throttle inlet pressure may be adjusted via adjusting a position of the turbocharger's waste gate. Method 400 proceeds to exit.

In this way, method 400 the electrically driven compressor may be deactivated in response to the exhaust gas driven compressor flowing more than a threshold amount of air. Consequently, electrical energy consumption may be reduced.

Thus, the method of FIG. 4 provides for a method for operating engine compressors, comprising: passing air through a first compressor and a second compressor in an engine air intake; and returning a portion of air passing through the second compressor to the engine air intake downstream of the first compressor and upstream of the second compressor via opening a charge air cooler bypass valve. The method includes where the portion of air passing through the second compressor to the engine air intake downstream of the first compressor and upstream of the second compressor is returned in response to condensation in a charge air cooler greater than a threshold. The method includes where the first compressor is a turbocharger compressor, and where the second compressor is an electrically driven compressor.

In some examples, the method further comprises increasing a speed of the second compressor in response to an indication of condensation in a charge air cooler greater than a threshold. The method further comprises returning the portion of air passing through the second compressor to an inlet of a charge air cooler. The method includes where the charge air cooler bypass valve bypasses a charge air cooler, and where the portion of air passing through the second compressor is returned in response to a charge air cooler condensation estimate that is based on output of a humidity sensor. The method includes where the charge air cooler condensation estimate is further based on air temperature and charge air cooler temperature.

The method of FIG. 4 also provides for a method for operating engine compressors, comprising: passing air through a first compressor and a second compressor in an engine air intake; and increasing flow of air passing through the second compressor and returning to the engine air intake downstream of the first compressor and upstream of the second compressor via opening a charge air cooler bypass valve in response to an estimate of condensation in a charge air cooler exceeding a threshold. The method further comprises closing an electric compressor bypass valve in response to the estimate of condensation in the charge air cooler.

In some examples, the method further comprises opening the electric compressor bypass valve and deactivating the second compressor in response to a desired engine air flow greater than a threshold when the estimate of condensation exceeds the threshold. The method further comprises closing the charge air cooler bypass valve in response to the desired engine air flow exceeding the threshold. The method further comprises increasing a throttle inlet pressure in response to an increase in the estimate of condensation. The method further comprises decreasing a throttle inlet pressure in response to a decrease in the estimate of condensation. The method includes where the speed of the second compressor is increased to increase flow of air passing through the second compressor.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. In addition, the terms aspirator or venturi may be substituted for ejector since the devices may perform in a similar manner.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating engine compressors, comprising:
   passing air through a first compressor and a second compressor in an engine air intake; and
   returning a portion of air passing through the second compressor to the engine air intake downstream of the first compressor and upstream of the second compressor via a controller opening a charge air cooler bypass valve, where the portion of air passing through the second compressor to the engine air intake downstream of the first compressor and upstream of the second compressor is returned in response to the controller estimating an amount of condensation in a charge air cooler greater than a threshold while operating an engine after determining engine operating conditions via sensors coupled to the controller, the amount of condensation estimated via the sensors.

2. The method of claim 1, where the first compressor is a turbocharger compressor, and where the second compressor is an electrically driven compressor.

3. The method of claim 1, further comprising increasing a speed of the second compressor via the controller in response to an indication of condensation in the charge air cooler greater than the threshold.

4. The method of claim 1, further comprising returning the portion of air passing through the second compressor to an inlet of the charge air cooler.

5. The method of claim 1, where the charge air cooler bypass valve bypasses the charge air cooler, and where the portion of air passing through the second compressor is returned in response to a charge air cooler condensation estimate that is based on output of a humidity sensor.

6. The method of claim 5, where the charge air cooler condensation estimate is further based on air temperature and charge air cooler temperature sensor inputs to the controller.

7. A method for operating engine compressors, comprising:
   passing air through a first compressor and a second compressor in an engine air intake; and
   increasing flow of air passing through the second compressor via increasing speed of the second compressor and returning air to the engine air intake downstream of the first compressor and upstream of the second compressor via opening a charge air cooler bypass valve via a controller in response to a controller estimate of condensation in a charge air cooler exceeding a threshold while operating an engine after determining engine operating conditions via sensors coupled to the controller, the speed of the second compressor increased via the controller.

8. The method of claim 7, further comprising closing an electric compressor bypass valve via the controller in response to the controller estimate of condensation in the charge air cooler, the controller estimate of condensation in the charge air cooler based on inputs from the sensors coupled to the controller.

9. The method of claim 8, further comprising opening the electric compressor bypass valve and deactivating the second compressor via the controller in response to a controller determined desired engine air flow being greater than a threshold when the controller estimate of condensation exceeds the threshold, the controller determined desired engine air flow based on the inputs from the sensors coupled to the controller.

10. The method of claim 9, further comprising closing the charge air cooler bypass valve via the controller in response to the controller determined desired engine air flow being greater than the threshold, the controller determined desired engine air flow based on the inputs from the sensors coupled to the controller.

11. The method of claim 7, further comprising increasing a throttle inlet pressure via the controller in response to an increase in the controller estimate of condensation in the charge air cooler, the controller estimate of condensation in the charge air cooler based on inputs from the sensors coupled to the controller.

12. The method of claim 7, further comprising decreasing a throttle inlet pressure via the controller in response to a decrease in the controller estimate of condensation in the charge air cooler, the controller estimate of condensation in the charge air cooler based on inputs from the sensors coupled to the controller.

13. The method of claim 7, where the speed of the second compressor is increased via the controller to increase flow of air passing through the second compressor.

14. An engine system, comprising:
an engine including an air intake;
an exhaust gas driven compressor positioned along the air intake;
an electrically driven compressor posited along the air intake downstream of the exhaust gas driven compressor;
a charge air cooler including a charge air cooler bypass passage and a charge air cooler bypass valve; and
a controller including non-transitory instructions to open the charge air cooler bypass valve in response to the controller estimating an amount of condensation in the charge air cooler exceeding a threshold while operating the engine after determining engine operating conditions via sensors coupled to the controller, the controller estimated amount of condensation in the charge air cooler based on inputs from the sensors coupled to the controller.

15. The engine system of claim 14, further comprising an electrically driven compressor bypass passage and an electrically driven compressor bypass valve.

16. The engine system of claim 15, further comprising additional non-transitory instructions to close the electrically driven compressor bypass valve in response to the controller estimating the amount of condensation in the charge air cooler exceeding the threshold, the controller estimated amount of condensation in the charge air cooler based on the inputs from the sensors coupled to the controller.

17. The engine system of claim 14, further comprising additional non-transitory instructions to adjust a throttle inlet pressure in response to the controller estimating the amount of condensation in the charge air cooler, the controller estimated amount of condensation in the charge air cooler based on the inputs from the sensors coupled to the controller.

18. The engine system of claim 17, further comprising additional non-transitory instructions to adjust the throttle inlet pressure in response to an engine air flow or a driver demand torque determined via the sensors coupled to the controller.

19. The engine system of claim 14, further comprising additional non-transitory instructions to increase air flow through the charge air cooler via the electrically driven compressor while maintaining a substantially constant engine torque.

* * * * *